United States Patent Office 3,285,882
Patented Nov. 15, 1966

3,285,882
CATALYSTS FOR POLYPHENYLENE SULFIDE TYPE RESINS
Roscoe A. Pike, Holden, Mass., assignor to Norton Company, Worcester, Mass., a corporation of Massachusetts
No Drawing. Filed Nov. 8, 1963, Ser. No. 322,493
16 Claims. (Cl. 260—79)

This invention relates to the catalyzed replacement of nuclear halogen by sulfur, particularly in the production of phenylene sulfide type polymers.

Both linear and crosslinked polyphenylene sulfides containing only carbon aromatic rings have been described in the literature, for example in U.S. Patents 2,513,188 and 2,538,941 to Macallum. Such resins are made by reacting sulfur with any polyfunctional nuclearly substituted aromatic chloride, bromide, or iodide such as phenyl, tolyl, naphthyl, diphenyl, and terphenyl. It has also been found, as disclosed in my patent application Serial No. 322,507, filed Nov. 8, 1963, entitled, "Triazine Modified Polyphenylene Sulfide Resins," that such resins can be modified by heterocyclic compounds which have aromatic groups having halogen nuclear substitution. For example, bis (p-chlorophenyl) phenyl-triazine and tris (p-chlorophenyl) triazine modifiers are found to enhance the thermal properties of the resulting resins, as compared to the unmodified resins.

In the preparation of the above resins I have found that the addition of certain amides (derivatives of both primary and secondary amides) having a halogen atom (chlorine, bromine, or iodine) attached directly to the amide nitrogen, considerably reduce the time necessary for completion of the reaction. I do not know precisely the mechanism by which the reaction rate is increased, but I believe it to be a free radical type of catalysis.

I have employed N-halo amides derived from aromatic and saturated aliphatic mono- and di-basic acids.

In particular I have found that any acid derivative having a nitrogen atom directly attached to at least one acyl group and having an iodine, bromine, or chlorine atom directly attached to the nitrogen atom, when employed in the amount of at least .005 equivalent per equivalent of nuclearly substituted iodine, bromine, or chlorine, effectively catalyzes the resin producing reaction. Thus, instead of requiring 20 hours at 275° C. to 360° C., such reactions can be completed in from 2 to 8 hours in the same temperature range.

Table I illustrates the use of N-bromosuccinimide as a catalyst for the production of linear, unmodified, polyphenylene-sulfide polymers.

TABLE I.—PREPARATION OF LINEAR POLYPHENYLENE SULFIDE POLYMERS USING N-HALOCARBOXYLIMIDES AS CATALYSTS [1]

| Catalysts | Wt. percent [2] | Reaction time (hrs.) at 280° C. | Wt. of polymer [3] (g.) |
|---|---|---|---|
| None | | 5 | 0.3 |
| N-bromosuccinimide | 1.31 | 5 | 0.4 |
| Do | 2.11 | 5 | 1.9 |
| Do | 4.35 | 5 | 1.3 |
| Do | 2.5 | [4] 3 | 1.1 |

[1] All reactions run in 15 cc. stainless steel vessel using glass liner. Reaction mixture was 1.0 g. sulfur, 3.5 g. sodium carbonate, 3.3 g. p-dichlorobenzene and catalyst.
[2] Amount of catalyst based on p-dichlorobenzene.
[3] Weight of dried polymer obtained after extracting reaction product with hot water followed by hot methanol and toluene. Theoretical amount of polymer based on p-dichlorobenzene is 2.4 g.
[4] 350° C.

The results show that at 280° to 350° C. for 3–5 hours, N-bromosuccinimide functions as a catalyst to give good conversions to polymer when used in a concentration about 0.5 mole percent based on the starting dihalogen substituted compound. A range of catalyst concentration from 0.5 mole percent to 4 mole percent is useful. The temperature could vary from 270 to 400° C. for from 2 to 8 hours with 4 to 6 hours at 280 to 300° C. preferred.

The use of various saturated N-halocarboxylamides to prepare the crosslinked polysulfide resins is illustrated in Table II.

TABLE II.—PREPARATION OF CROSSLINKED POLYPHENYLENE SULFIDE RESINS USING N-HALOCARBOXYLAMIDES [1]

| Catalyst [2] | Wt. percent | Reaction time (hrs.) at 300° C. | Wt. of Polymer [3] (g.) |
|---|---|---|---|
| None | | 5 | 0.8 |
| N-bromosuccinimide | 2.2 | 5 | 1.4 |
| Do | 4.4 | 5 | 2.4 |
| N-bromophthalimide | 2.4 | 5 | 0.8 |
| Do | 4.3 | 5 | 1.3 |
| N-iodosuccinimide | 2.4 | 5 | 0.8 |
| Do | 4.3 | 5 | 1.9 |
| N-bromosuccinimide | 4.4 | [4] 3 | 2.0 |
| N-bromoacetamide | 4.4 | 5 | 1.5 |

[1] All reactions run in 15 cc. steel vessel using glass liner at 280° C. for 5 hours, except where indicated. Reaction mixture was 2.7 g. p-dichlorobenzene, 0.5 g. 1,2,4-trichlorobenzene, 1.1 g. sulfur, 3.5 g. sodium carbonate and catalyst.
[2] Amount of catalyst based on total amount of halogenated aromatic compounds.
[3] Weight of dried polymer obtained after extracting reaction product with hot water, followed by hot methanol and toluene. Theoretical amount of polymer based on total amount of halogenated aromatic compound is 2.32 g.
[4] 350° C.

These results agree with those of Table I and confirm that the catalyst content range, for useful results, is from 0.5 to 4 mole percent of catalyst, based on the moles of nuclearly substituted halogen atoms present.

What is claimed is:
1. A method for catalyzing the replacement of aromatic nuclear halogen by sulfur comprising carrying out the reaction in the presence of a catalyst which is a saturated carboxylic acid derivative having a halogen atom directly attached to a nitrogen atom which is directly attached to at least one acyl group, said halogen atom being selected from the group consisting of chlorine, bromine, and iodine and said reaction mix containing, initially, elemental sulfur, a compound selected from the group consisting of alkali metal and alkaline earth metal oxides, carbonates and sulfides, and at least one compound having aromatic-nuclearly substituted halogen groups, said halogen being selected from the group consisting of chlorine, bromine, and iodine.

2. A method as in claim 1 in which the carboxylic acid derivative is present in the amount of at least 0.5 mol percent, based on the mols of nuclearly substituted halogen atoms present in the reaction mixture.

3. A method as in claim 1 in which the carboxylic acid derivative is present in the amount of between 0.5 and 4 mol percent based on the mols of nuclearly substituted halogen atoms present in the reaction mixture.

4. A method as in claim 1 in which the carboxylic acid derivative is present in the amount of from 0.5 to 4 mol percent based on the number of mols of nuclearly substituted halogen atoms present in the reaction mixture.

5. A method according to claim 1 in which the reaction is carried out under autogenous pressure at a temperature of from 280° C. to 350° C. for from 3 to 5 hours.

6. A method according to claim 1 in which the reaction is carried out under autogenous pressure at a temperature of 275° C. to 400° C. for from 2 to 8 hours.

7. A method according to claim 1 in which the reaction is carried out under autogenous pressure at a temperature of from 280 to 300° C. for from 4 to 6 hours.

8. A method according to claim 1 in which the carboxylic acid derivative is N-bromosuccinimide.

9. A method according to claim 1 in which the carboxylic acid derivative is N-bromophthalimide.

10. A method according to claim 1 in which the carboxylic acid derivative is N-iodosuccinimide.

11. A method according to claim 1 in which the carboxylic acid derivative is iso-cyanuric bromide.

12. A method according to claim 1 in which the carboxylic acid derivative is N-bromocaprolactam.

13. A method according to claim 1 in which the carboxylic acid derivative is N-chlorosuccinimide.

14. A method according to claim 1 in which the carboxylic acid derivative is N-bromoacetamide.

15. A method according to claim 4 in which the aromatic-nuclearly substituted halogen compound is selected from the group consisting of nuclearly halogen substituted benzene hydrocarbons and halo-phenyl substituted triazines and mixtures thereof, wherein the halo group is selected from the group consisting of chlorine, bromine, and iodine atoms.

16. A method according to claim 15 in which the reaction mix includes at least one tri-substituted halogen compound to effect cross linking in the product.

References Cited by the Examiner

UNITED STATES PATENTS

| 2,513,188 | 6/1950 | Macallum | 260—79 |
| 2,538,941 | 1/1951 | Macallum | 260—79 |

JOSEPH L. SCHOFER, *Primary Examiner.*

J. F. McNALLY, D. K. DENENBERG,
*Assistant Examiners.*